United States Patent [19]

Chern

[11] Patent Number: 4,953,839
[45] Date of Patent: Sep. 4, 1990

[54] VISE

[76] Inventor: Sen-Kuen Chern, No. 660, Hsing-HO Rd., Sha-Lu Town, Taichung Hsing, Taiwan

[21] Appl. No.: 414,171

[22] Filed: Sep. 28, 1989

[51] Int. Cl.⁵ .............................................. B23Q 1/04
[52] U.S. Cl. ..................................... 269/73; 269/222
[58] Field of Search ................... 269/222, 79, 73, 71, 269/82–85

[56] References Cited

U.S. PATENT DOCUMENTS

| | | | |
|---|---|---|---|
| 298,777 | 5/1884 | Riggs | 269/222 |
| 721,639 | 2/1903 | Wermes | 269/222 |
| 1,383,524 | 7/1921 | Carlson | 269/73 |
| 2,051,427 | 8/1936 | Snavely | 269/73 |
| 2,278,258 | 3/1942 | Enghauser | 269/222 |
| 2,353,891 | 7/1944 | Gruntorad | 269/79 |
| 2,947,214 | 8/1960 | Schwuttke et al. | 269/73 |

*Primary Examiner*—Robert C. Watson
*Attorney, Agent, or Firm*—Browdy and Neimark

[57] ABSTRACT

A vise capable of perfectly, accurately, neatly and effectively clamping thereon a workpiece is provided. The vise includes a base having two side walls an angular scale-provided elongate body attaching thereon a first jaw member, a connecting rod pivotally connecting together the base and the body, a movable seat attaching thereon a second jaw member, two following gears rotatably but untranslatably attached to the body, two guiding screw rods mounted in the following gears and horizontally spacedly urging against the movable seat, a shaft rotatably mounted in the body and mounting thereon an active gear meshed between the following gears, a driving handle, a reinforcing locking member having a threaded hole, and a bolt passing through one of the side walls to be threaded into the threaded hole and capable of being rotated to tightly urge the body against the one side wall.

11 Claims, 13 Drawing Sheets

VISE

BACKGROUND OF THE INVENTION

The present invention relates to a vise, and more particularly to a vertically pivotable one.

Figure 1:
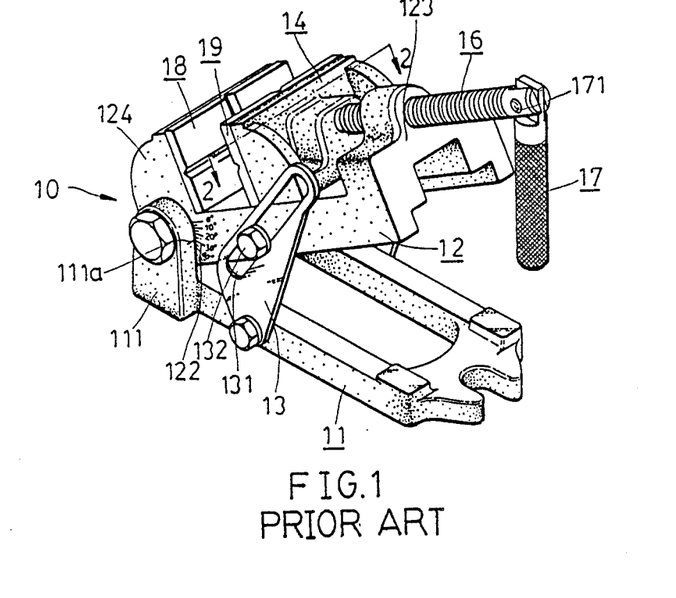
FIG. 1 is a perspective view showing a vise according to the prior art.
Figure 2:
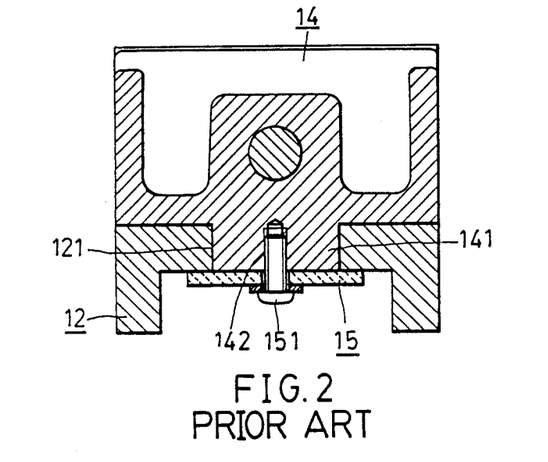
FIG. 2 is a sectional view taken along line 2—2 in FIG. 1.

The vise is an important machine tool and conventionally includes as shown in FIGS. 1 and 2 a base 11 having two end side extensions 111 one of which is provided with a base line 111a, a body 12 pivotally mounted between side extensions 111 and having a longitudinal groove 121 and an angular scale 122, two adjusting triangles 13 respectively pivoted to two sides of base 11 and each of which has an elongate groove 131 through which a bolt 132 can pass to be threaded into one side of body 12, a movable seat 14 having a lower protrusion 141 which is slidably received in groove 121 and has a bottom screw hole 142, a limiting plate 15 through which a bolt 151 passes into screw hole 142, a screw rod 16 screwedly passing through an end piece 123 of body 12 to be rotatably but untranslatably fixed to movable seat 14 attaching thereto a jaw member 19, a driving handle 17 pivotally connected to screw rod 16 by a rivet 171, and another jaw member 18 attached to an opposite end piece 124 of body 12 so that body 12 and base 11 can have an included angle variable between 0 and 90 degrees for angularly working.

Figure 3:
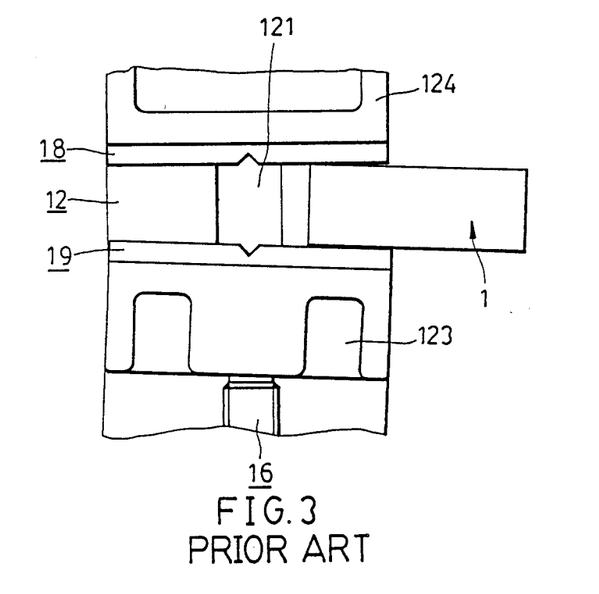
FIG. 3 is a schematic view showing a vise in FIG. 1 sidely clamping a workpiece to cause a "trumpet mouth"

Such vise suffers from the following disadvantages:

(1) Since screw rod 16 is centrally connected to movable seat 14, as shown in FIG. 3, the vise 10 can only clamp thereon a small part of a work piece 1 to form a so-called "trumpet mouth" between jaw members 18 and 19 if workpiece 1 is relatively short and needs to be sidely clamped for working so that the clamping effect is not good to badly affect the working accuracy or even workpiece 1 will escape from vise 10.

(2) Seat 14 is slidably guided in groove 121 by limiting plate 15 which results in that if vise 10 is fixed on a milling machine or the like, the vibration caused easily gets bolt 151 loosened which in turn results in that seat 14 can no longer be smoothly guided in groove 121 and that workpiece 1 is slightly vertically displaceable to badly influence the working accuracy.

(3) If vise 10 is to act as an angle vice, the force imparted by the working machine on body 12 is primarily taken by adjusting triangles 13 which always are of iron plates being not very thick and will be flexed or deformed upon executing a heavy cutting.

SUMMARY OF THE INVENTION

It is therefore an object of the present invention to provide a vise capable of sidely clamping a workpiece without causing a trumpet mouth.

It is further an object of the present invention to provide a vise having a movable seat capable of being perfactly guided in the body thereof.

It is additional an object of the present invention to provide a vise having a reinforcing locking member capable of effectively supporting the body on the vise upon executing a heavy cutting on a workpiece.

According to the present invention, a vise includes a base, an angular scale-provided elongate body attaching thereon a first jaw member, a connecting rod pivotally connecting together the base and the body, a movable seat attaching thereon a second jaw member, two following gears rotatably but untranslatably attached to the body, two guiding screw rods mounted in the following gears and horizontally spacedly urging against the movable seat, a shaft rotatably mounted in the body and mounting thereon an active gear meshed between the following gears, a driving handle, a reinforcing locking member having a threaded hole, and a bolt passing through one of the side walls of the base to be threaded into the threaded hole and capable of being rotated to assistantly tightly urge the body against the one side wall.

The present vise can further include a pivoting medium which is pivotally connected to the base and rotatably mounts thereon the body so that the present vise can rotatively clamp thereon a workpiece for working.

The present invention may best be understood through the following description with reference to the accompanying drawings, in which:

DETAILED DESCRIPTION OF THE PREFERRED EMBODIMENT

Referring now to FIGS. 4–8, a first preferred embodiment of a vise according to the present invention includes a base 20, a horizontal positioning member 24 having a bolt 241 and a nut 242, a vertical positioning member 25 having a bolt 251 and a nut 252, a body 30, a movable seat, an operation mechanism 50, two jaw members 100 and 110, a cover 120 and two reinforcing locking sets 60. Base 20 includes a base plate 21 having two upward side walls 22 and 23 each of which includes a flat portion 221 (231) having thereunder a through hole 223 (233) and thereon a screw hole 227 and an arcuate portion 222 (232) having thereunder a through hole 224 (234) and thereon a screw hole 235 communicating with through hole 234, an indicating piece 225 placed on the connecting place of portions 221 and 222 and having thereon a base line 226, and an end screw hole (not shown) screwedly threading thereto bolt 251 screwedly engaging thereon nut 252 matching against base plate 21. Bolt 241 is screwed to screw hole 227 and screwedly engages thereon nut 242 matching against flat portion 221.

Figure 4:
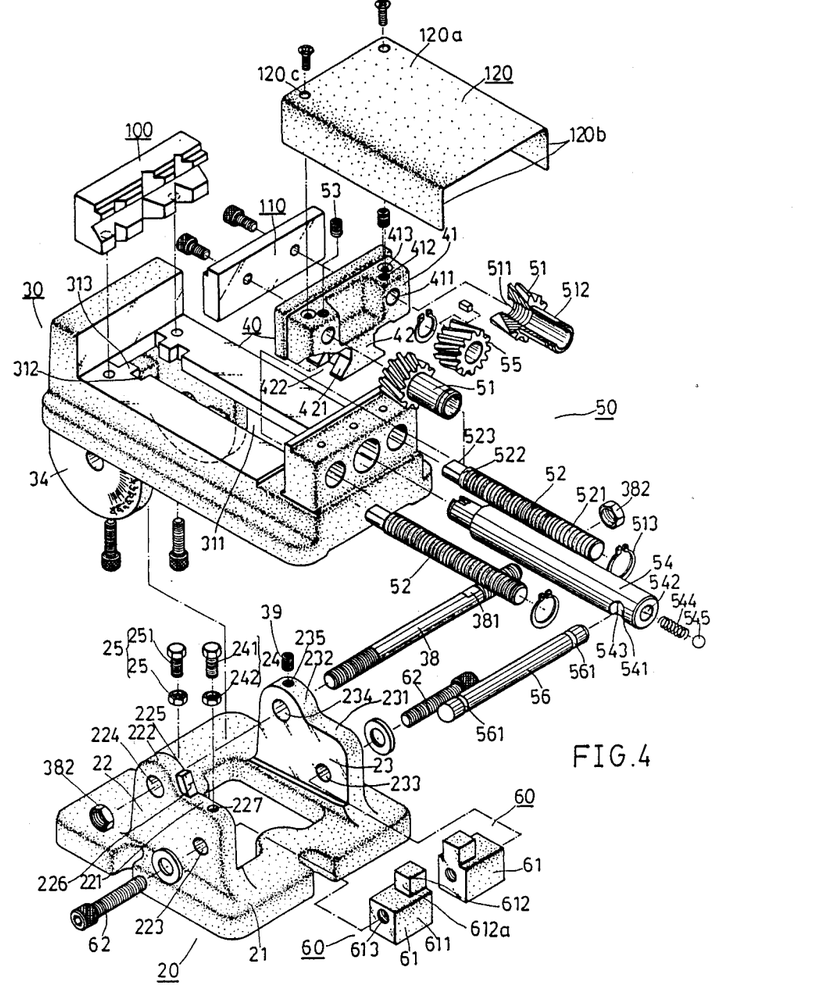
FIG. 4 is an exploded view showing a first preferred embodiment of a vise according to the present invention.
Figure 5:
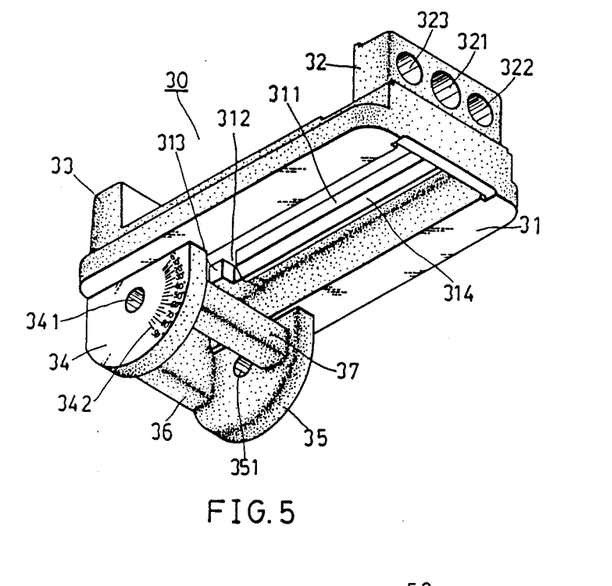
FIG. 5 is a perspective view showing a body of a vise in FIG. 4.
Figure 6:
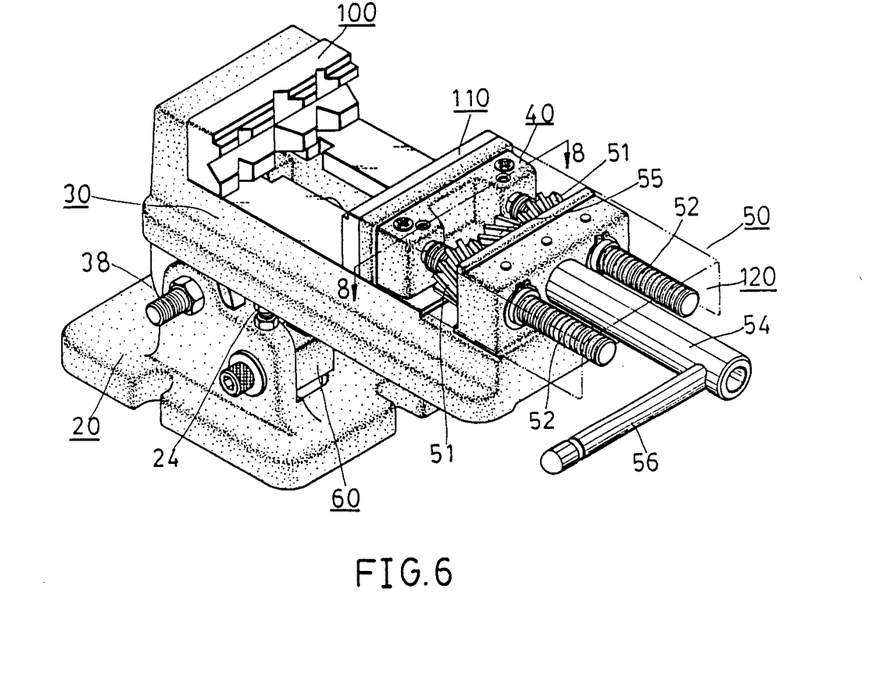
FIG. 6 is a perspective view showing a vise in FIG. 4.

Body 30 includes an elongate plate 31 having a front end piece 32 having an intermediate hole 321 and two side holes 322 and 323 and a rear end piece 33 attaching thereto jaw member 100, a first end side plate 34 having a central hole 341 and an angular scale 342, a second end side plate 35 having a central hole 351, two reinforcing ribs 36 and 37 provided between side plates 34 and 35, a longitudinal through groove 311 provided in plate 31 and having an enlarged end 312 forming on the defining walls thereof a pair of facing protrusions 313 and two opposite facing walls each of which has a lower inclined surface 314, a connecting rod 38 passing through holes 224, 341, 351 and 234 and pivotally connecting together base 20 and body 30 to enable side walls 22 and 23 to fixedly clamp therebetween side plates 34 and 35, a screw 39 threading through screw hole 235 to urge against a flattened portion 381 of rod 38, and two nuts 382 respectively screwed to two threaded ends of rod 38.

Movable seat 40 includes an upper piece 41 attaching thereto jaw member 110 and having two side blind holes 411 and two top screw holes 412 respectively communicating with blind holes 411 and adjacent to another two top screw holes 413, and a lower engaging piece 42 having two crosssectionally triangular side extensions 421 having a pair of indentations 422 capable of respectively passing therethrough the pair of protrusions 313 by which lower engaging piece 42 can be put to be slidably guided in through groove 311.

Operating mechanism 50 includes two following bevel gears 51 each of which includes a hollow shaft 512 having an inner threaded portion 511 and rotatably but untranslatably mounted in side hole 322 (323) by a retaining ring 513 rotatably engaging therein shaft 512, two guiding screw rods 52 each of which includes a rod body 521 screwedly rotatably mounted in threaded portion 511 and an engaging end 522 having a flattened portion 523 and inserted in a respective blind hole 411, two screws 53 respectively passing through screw holes 412 to urge against flattened portions 523 of rods 52, a shaft 54 rotatably mounted in intermediate hole 321 and having a first end 546 and a second opposite end which includes an axial hole 542 and a radial hole 541 communicating with axial hole 542 and having the defining wall thereof been further provided with a blind hole 543 capable of receiving therein a coil spring 544 and a ball 545, an active bevel gear 55 keyed to first end 546 of shaft 54 and meshed between following gears 51, and a driving handle 56 slidably inserted in radial hole 541 of shaft 54 and having two end annular grooves 561 against each of which spring 544 biasses ball 545 to urge to prevent handle 56 from disengaging with shaft 54.

Cover 120 includes a top plate 120a having two holes 120c through which two screws can respectively pass to be screwed in screw holes 413 of seat 40, and two side plates 120b for protecting and covering thereunder the relevant elements.

Each of locking sets 60 includes a locking member 61 having a base piece 611 having a threaded hole 613 and an upper extension 612 having a locking surface 612a, and a bolt 62 passing through hole 223 (233) of side wall 22 (23) to be threaded into threaded hole 613.

Figure 7:
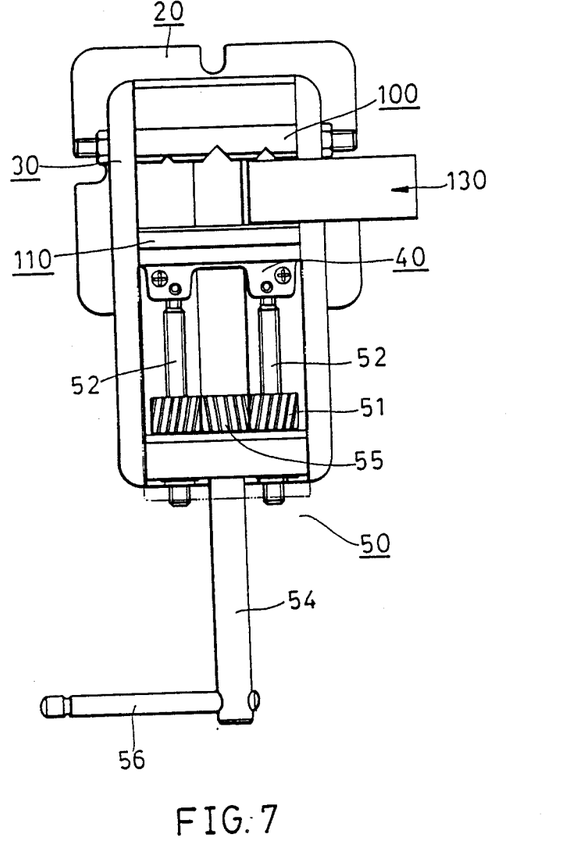
FIG. 7 is a top view showing a vise in FIG. 6 in clamping a workpiece.
Figure 8:
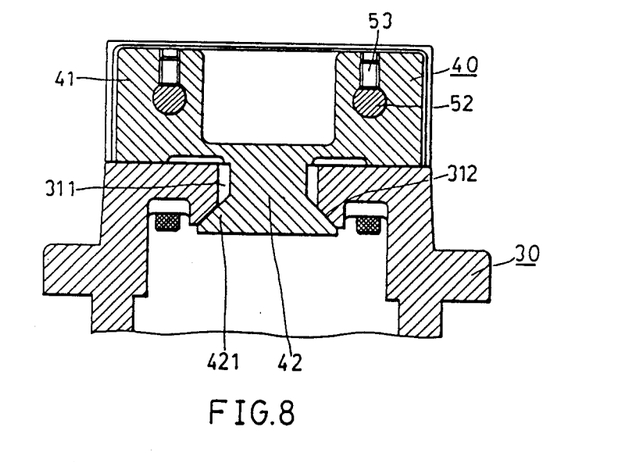
FIG. 8 is a sectional view taken along line 8—8 in FIG. 6.

After the above elements are properly assembled, if handle 56 is operated to revolve around shaft 54, active gear 55 will untranslatably rotate following gears 51 to translate movable seat 40 to clamp or release a workpiece 130 between jaw members 100 and 110 so that a "trumpet mouth" will not appear between members 100 and 110 again since the clamping force is oppositely symmetrically applied on movable seat 40. In addition, since lower engaging piece 42 is dovetail-shaped and integrally formed to upper piece 41, the vibration produced by the working machine will not loosen the engagement between seat 40 and body 30.

Figure 9:
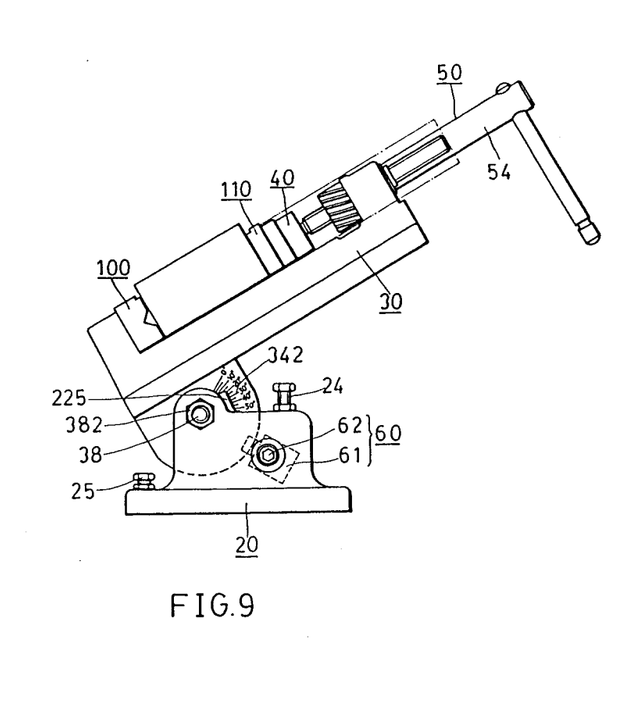
FIG. 9 is a side view showing a vise in FIG. 6 in use.

The operating procedure of the present vise as schematically shown in FIG. 9 is as follows:

End nuts 382 on rod 38 are loosened, then body 30 is desiredly pivoted with respect to base 20 by checking the relationship between base line 226 and angular scale 342 and then nuts 382 are tightly screwed on rod 38 again. Then, bolts 62 are respectively tightly screwed inthreaded holes 613 of locking members 61 respectively thus having locking surfaces thereof 612a urging side plates 34 and 35 against side walls 22 and 23 so that the present vise is suitable for use in a heavy cutting operation since body 30 will not forcedly downwardly pivot with respect to base 20 again.

Figure 10:
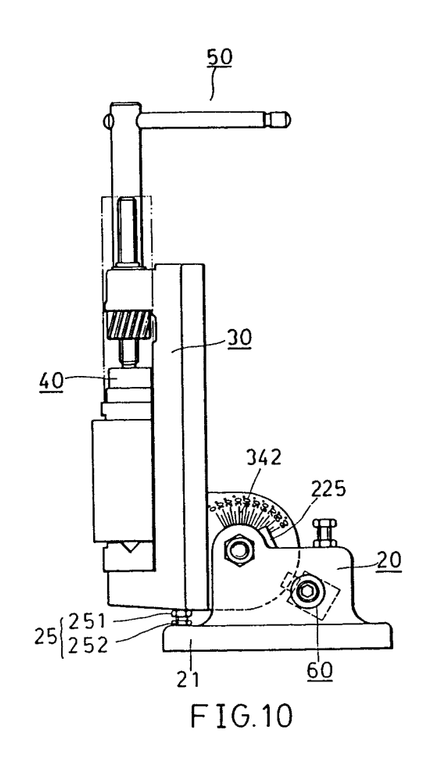
FIG. 10 is a side view showing a vise in FIG. 6 having an inclined angle of 90 degrees.

As shown in FIG. 10, if body 30 is to be inclined with respect to base 20 by 90 degrees, vertical positioning member 25 can be conveniently used for this purpose without the necessity of checking base line 226 and scale 342. Certainly, positioning member 25 should first be properly adjusted. The adjusting procedure is performed by first loosening nut 252, then vertically translating bolt 251 properly by the assistance of base line 226 and scale 342 and finally tighting nut 252 against base plate 21 again.

Figure 11:
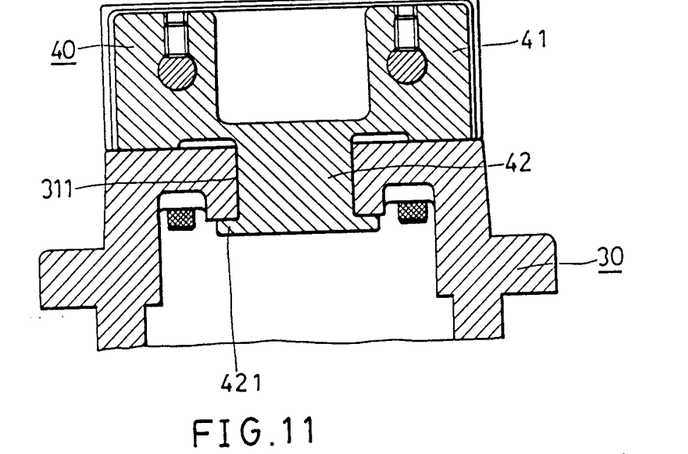
FIG. 11 is a sectional view showing a different movable seat for a vise in FIG. 6.

Certainly, as shown in FIG. 11, side extensions 421 of lower engaging piece 42 of seat 40 can alternatively be crosssectionally rectangular and be slidably guided in groove 311 having no more inclined surfaces on the dinfining walls thereof.

As shown in FIGS. 12–16, a second preferred embodiment of a vise according to the present invention includes a base 70, a pivoting medium 80, a body 90, a movable seat 140, an operating mechanism 150, two jaw members 160 and 170, a cover 180 and a reinforcing locking set 190 and merely differs from the first embodiment shown in FIGS. 4–10 in having different base 70, pivoting medium 80 and body 90 which will be described hereinafter.

Figure 12:
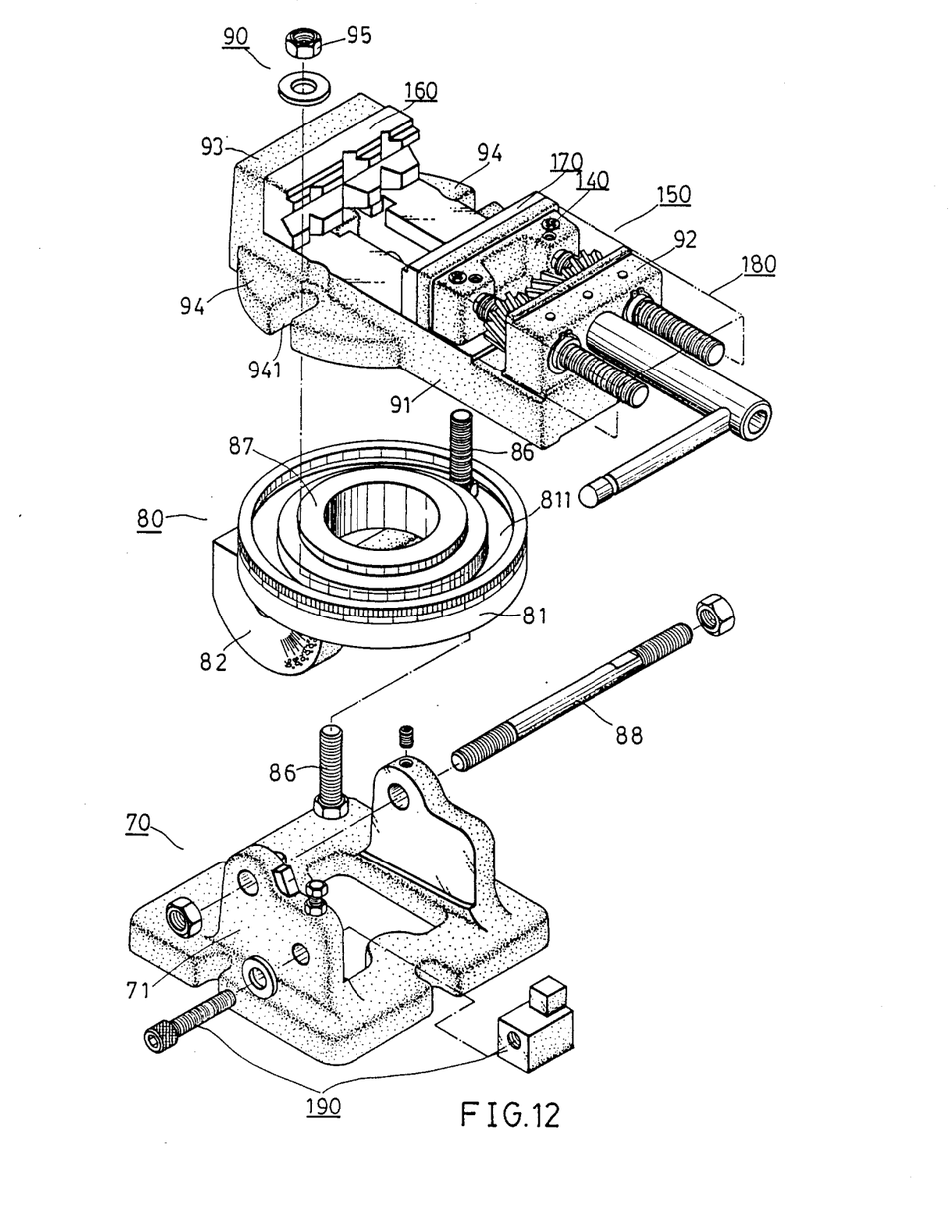
FIG. 12 is a partly exploded view of second preferred embodiment of a vise according to the present invention.

Base 70 mounts only one locking set 190 to one side wall thereof 71.

Figure 13:
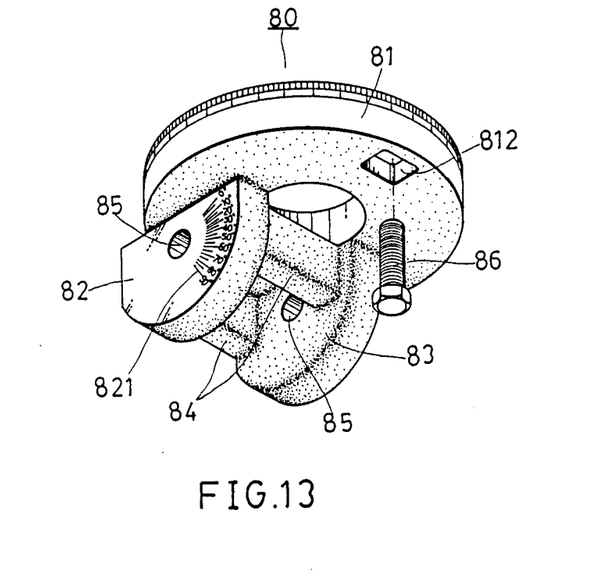
FIG. 13 is a perspective view showing a pivoting medium of a vise in FIG. 12.

Pivoting medium 80 includes a circular base 81 having a central raised top 87 and an inverted T-crosssectional annular groove 811 having a bottom wall provided with a through hole 812, two lower side plates 82 and 83 respectively having central holes 85, two reinforcing ribs 84 formed between side plates 82 and 83, two inverted bolts 86 respectively passing through hole 812 with the heads thereof slidably guided in annular groove 811, and a connecting rod 88 pivotally connecting together pioting medium 80 and base 70.

Body 90 includes an elongate plate 91 which includes a front end plate 92, a rear end plate 93, two side extensions 94 each of which has a middle indentation 941 through which a respective bolt 86 can pass to screw thereon a nut 95 enabling body 90 to be securely mounted on pivoting medium 80, a bottom recess (not shown) rotatably matching therein raised top 87 of medium 80, and a rear extension 96 having thereon a second base line 961 cooperating with a circular angle scale of circular base 81 to indicate an angle that body 90 is rotated with respect to pivoting medium 80.

Figure 14:
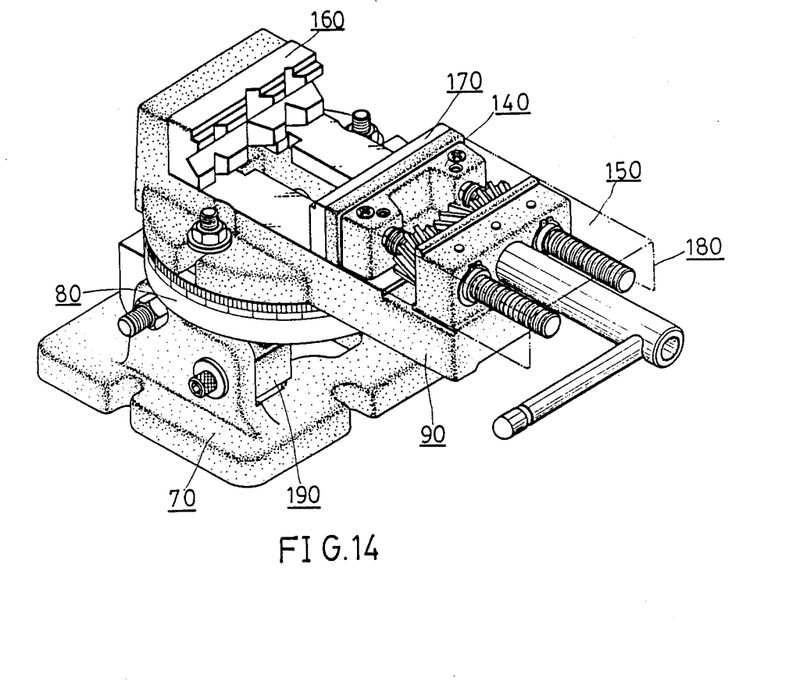
FIG. 14 is a perspective view showing a vise in FIG. 12.
Figure 15:
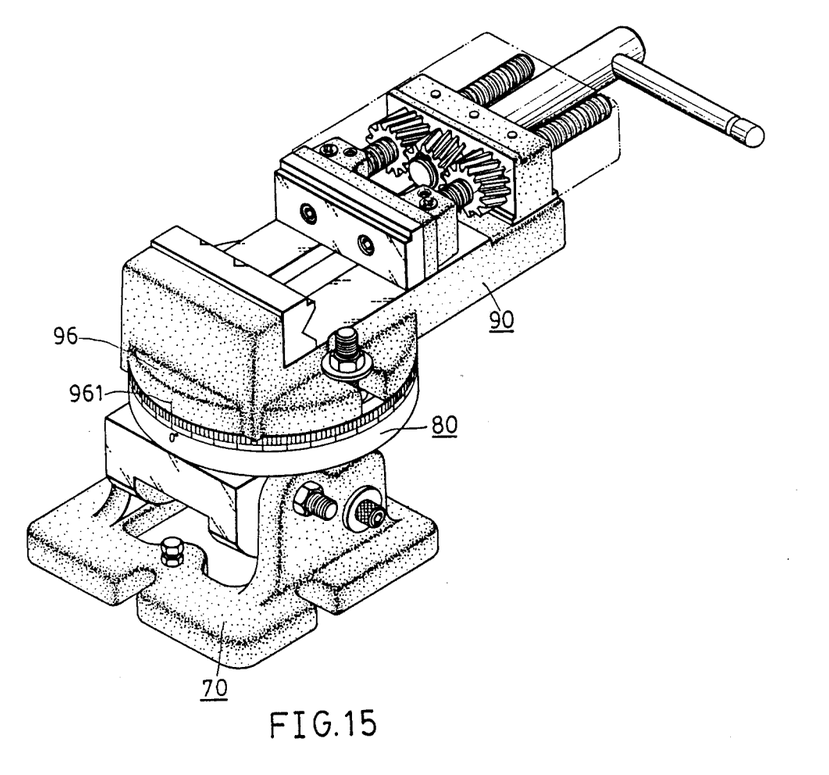
FIG. 15 is further a perspective view showing a vise in FIG. 12.
Figure 16:
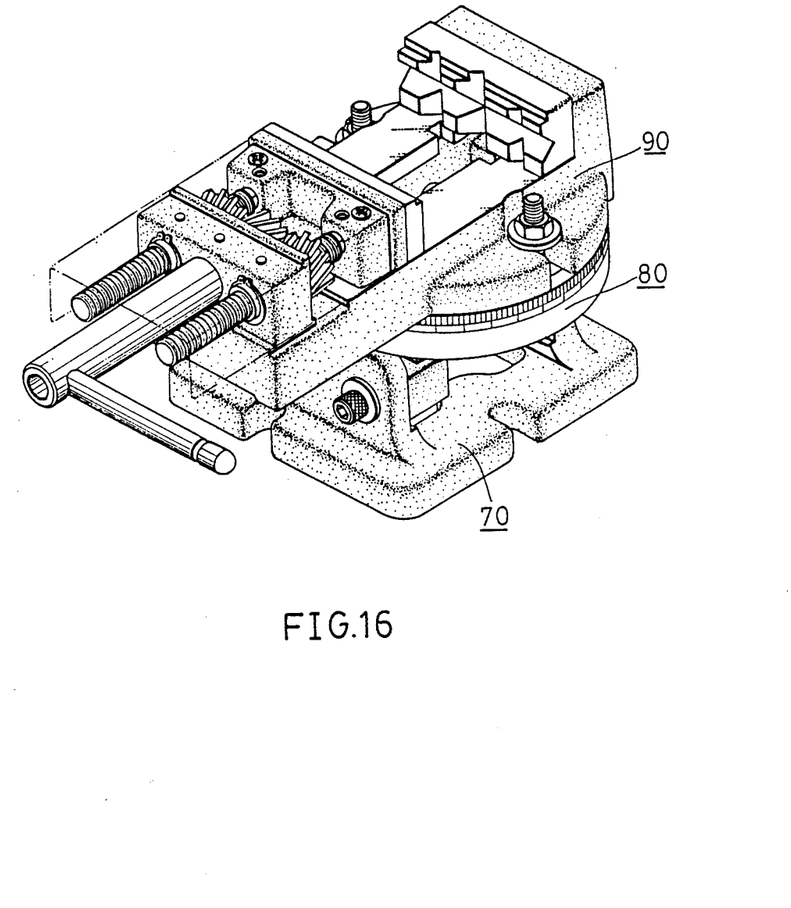
FIG. 16 is additional a perspective view showing a vise in FIG. 12.

In use, nuts 95 are first loosened, then body 90 is desiredly rotated with respect to pivoting medium 80 by the assistance of base line 961 and the circular angle scale of circular base 81, and then nuts 95 are tightly screwed on bolts 86 again.

Although this embodiment only uses one reinforcing locking set 190, it has been proved to be enough in providing a desired locking effect.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:

1. A vise comprising:
    a base having two side walls and a base line for an aligning purpose;
    an elongate body having a first end, a second opposite end having an intermediate hole and side holes, a middlely longitudinal through groove, and two end side plates one of which is provided with an angular scale capable of being utilized together with said base line to indicate an angle included by said base and said elongate body;
    a connecting rod pivotally connecting together said base and said elongate body and capable of allowing said side walls to fixedly clamp therebetween said side plates;
    a movable seat having a lower engaging piece which includes two side extensions and is capable of being slidably guided in said groove;
    two following gears rotatably, untranslatably and horizontally spacedly attached to said second end;
    two guiding screw rods respectively passing through two side holes, screwedly rotatably and respectively coaxially mounted in said following gears and respectively having one ends thereof capable of horizontally spacedly urging against said movable seat;
    a shaft rotatably mounted in said second end and passing through said intermediate hole;
    an active gear mounted on said shaft and meshed between said following gears;
    a driving handle connected to said shaft;
    a first jaw member attached to said first end;
    a second jaw member attached to said movable seat;
    a reinforcing locking member having a threaded hole; and
    a bolt passing through one of said side walls to be threaded into said threaded hole and capable of being rotated to assistantly tightly urge one of said side plates against said one side wall.

2. A vise according to claim 1, further comprising a cover fixed to said movable seat and covering thereunder said movable seat, said second end, said guiding screw rods, said active and following gears and said shaft.

3. A vise according to claim 1 wherein said active and following gears are bevel gears.

4. A vise according to claim 1, further comprising another reinforcing locking member having another threaded hole, and another bolt passing through the other said side wall to be threaded into said another threaded hole.

5. A vise according to claim 1 wherein said side plates include therebetween a rib member.

6. A vise according to claim 1 wherein each of said following gears further includes a hollow shaft rotatably mounted in one respective said side hole.

7. A vise according to claim 1 wherein said movable seat includes two upper side blind holes fixedly receiving therein said one ends of said guiding screw rods respectively.

8. A vise according to claim 1 wherein:
    said body has one end of said through groove been enlarged in order to put therefrom said lower engaging piece into said through groove;
    the wall defining said one groove end includes a pair of opposite protrusions; and
    said lower engaging piece has said two side extensions been provided with a pair of opposite indentations respectively capable of passing therethrough said protrusions.

9. A vise according to claim 8 wherein said side extensions are crosssectionally triangular.

10. A vise according to claim 8 wherein said side extensions are crosssectionally rectangular.

11. A vise comprising:
    a base having two side walls and a base line for an aligning purpose;
    a pivoting medium having a circular angle scale and two lower side plates one of which is provided with an angular scale;
    a connecting rod pivotally connecting together said base and said pivoting medium and capable of allowing said side walls to fixedly clamp therebetween said side plates;
    an elongate body conditionally rotatably mounted on said pivoting medium and having a first end, a second opposite end having an intermediate hole and side holes, a middlely longitudinal through groove and a second base line capable of being utilized together with said circular angle scale to indicate an angle that said body is rotated with respect to said pivoting medium;
    a movable seat having a lower engaging piece which includes two side extensions and is capable of being slidably guided in said groove;
    two following gears rotatably untranslatably and horizontally spacedly attached to said second end;
    two guiding screw rods respectively passing through said two side holes, screwedly rotatably and respectively coaxially mounted in said following gears and respectively having one ends thereof capable of horizontally spacedly urging against said movable seat;
    a shaft rotatably mounted in said second end and passing through said intermediate hole;
    an active gear mounted on said shaft and meshed between said following gears;
    a driving handle connected to said shaft;
    a first jaw member attached to said first end;
    a second jaw member attached to said movable seat;
    a reinforcing locking member having a threaded hole; and
    a bolt passing through one of said side walls to be threaded into said threaded hole and capable of being rotated to assistantly tightly urge one of said side plates against said one side wall.

* * * * *